United States Patent
Shyy et al.

(10) Patent No.: US 6,178,334 B1
(45) Date of Patent: Jan. 23, 2001

(54) CELLULAR/PCS NETWORK WITH DISTRIBUTED-RF BASE STATION

(75) Inventors: Dong-Jye Shyy, McLean, VA (US); Cathy Zatloukal, Gaithersburg; Khalid Karimullah, Olney, both of MD (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/193,632

(22) Filed: Nov. 17, 1998

(51) Int. Cl.$^7$ .................................................. H04B 7/01
(52) U.S. Cl. .......................... 455/503; 455/502; 455/446
(58) Field of Search .................. 455/67.1, 67.3, 455/67.6, 422, 446, 502, 503, 560, 561

(56) References Cited

U.S. PATENT DOCUMENTS

| | | | |
|---|---|---|---|
| 4,411,007 | * | 10/1983 | Rodman et al. ........................ 455/502 |
| 4,475,246 | * | 10/1984 | Batlivala et al. ..................... 455/503 |
| 4,696,052 | * | 9/1987 | Breeden ................................. 455/503 |
| 5,038,403 | * | 8/1991 | Leitch ..................................... 455/503 |
| 5,117,503 | * | 5/1992 | Olson .................................... 455/67.1 |
| 5,201,061 | * | 4/1993 | Goldberg et al. ..................... 455/503 |
| 5,239,671 | * | 8/1993 | Linquist et al. ...................... 455/503 |
| 5,261,118 | * | 11/1993 | Vanderspool et al. ............... 455/503 |
| 5,361,398 | * | 11/1994 | Christian et al. ..................... 455/503 |
| 5,423,063 | * | 6/1995 | Goldberg .............................. 455/503 |
| 6,011,977 | * | 1/2000 | Brown et al. ......................... 455/503 |
| 6,018,667 | * | 1/2000 | Ghosh et al. ......................... 455/502 |
| 6,061,573 | * | 5/2000 | Goldberg .............................. 455/503 |

* cited by examiner

Primary Examiner—Dwayne D. Bost
Assistant Examiner—Quang Vu
(74) Attorney, Agent, or Firm—John T. Whelan; Michael W. Sales

(57) ABSTRACT

This disclosure relates to a communications network including a base station and two or more distributed cells which are remote from the base station. The cells are coupled to the base station by transmission mediums which may, for example, be cable, fiber, and/or air. Between the base station and each cell, there is a time delay or transmission time, between the time when a communication that is received at one of the two is transmitted to and is received by the other of the two. The time delays of the two cells are unique or distinct one from the other. The network includes a time responsive system which is responsive to the time delay for a communication between the base station and one of the cells. Since the time delays are distinctive, the time responsive system identifies the cell associated with the communication. The time delays of the cells may be inherent in the circuitry and transmission mediums between the base station and the cells. A time delay element also may be provided to modify the time delay of one or more of the cells, if the inherent time delays are not sufficiently distinct.

13 Claims, 4 Drawing Sheets

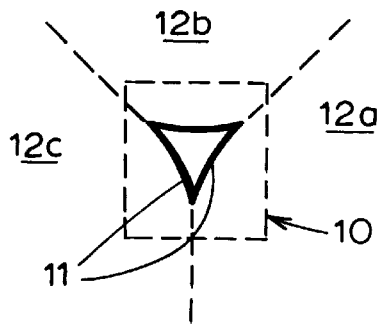
FIG. 1 PRIOR ART
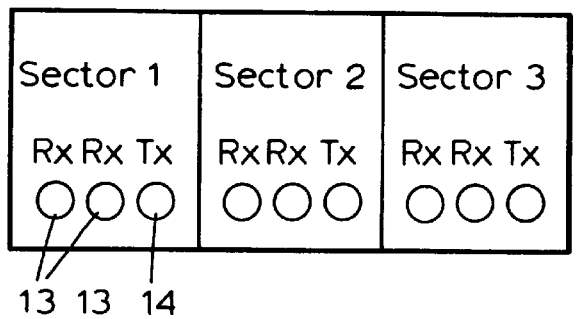
FIG. 2 PRIOR ART
| D-RF Cell(1) | D-RF Cell(2) | D-RF Cell(3) | D-RF Cell(4) | ··· (n) |
|---|---|---|---|---|
| Rx Rx Tx | Rx Rx Tx | Rx Rx Tx | Rx Rx Tx | |
| ○○○ | ○○○ | ○○○ | ○○○ | |
FIG. 4

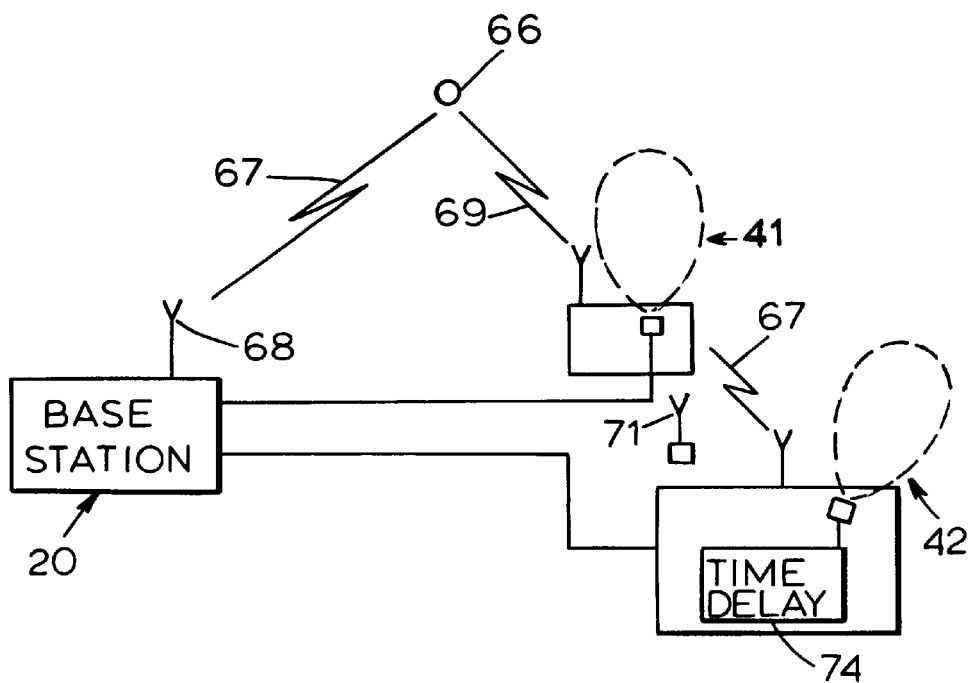
FIG. 5
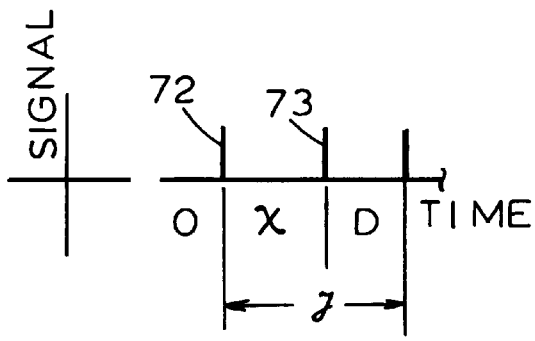
FIG. 6
| TIME DELAY | 2.1 | 3.0 | 2.6 | 1.8 | 3.5 | — — — — | 1.0 |
|---|---|---|---|---|---|---|---|
| CELL # | 31 | 32 | 33 | 41 | 42 | — — — — | M |
FIG. 7

CELLULAR/PCS NETWORK WITH DISTRIBUTED-RF BASE STATION

BACKGROUND OF THE INVENTION (a) Field of the Invention

This invention relates generally to communication systems, and more particularly to a cellular/PCS network including at least one distributed-RF base station and multiple distributed cells.

(b) Description of Related Art

A traditional PCS or cellular communications network includes a number of spaced apart base stations, each station including antennas located on a tower or other structure at the base station. Such a base station, with antennas, is referred to as a cell site, and the antennas separate the surrounding geographical area into sectors (often each cell site forms three sectors). A cellular user communicates with a base station via antennas; a mobile user may be "handed off" as the vehicle moves from one sector to another or from the jurisdiction of one base station to another.

It is also known in the prior art to provide a PCS or cellular distributed cell network including a base station and a number of distributed cells. In this structure, a number of cells are spaced from the base station and are coupled with the base station by various transmission mediums. Transmission between the base station and the distributed cells may be through mediums such as cable, fiber and/or air. The distributed cells may include remote cells, narrow-beam cells and repeater cells, for example.

In a prior art distributed cell network, a forward call to a designated mobile, for example, is sent by the base station to all distributed cells of a sector. The operative cell where the mobile is located then forwards the call to the mobile. After the mobile responds with a reverse signal, the base station continues to send forward calls to all cells of the sector. There are disadvantages to this arrangement such as the fact that unnecessary energy is expended when transmitting to non-operative cells (i.e., to other than the operative cell where the mobile is located). Further, needless forward link capacity to the non-operative cells is wasted.

OBJECT OF THE INVENTION

It is a general object of the present invention to provide an improved communication network including a base station and a plurality of distributed cells, including means for distinguishing between the various cells. Consequently, transmission of information from the base station may be restricted to an operative cell, or to an operative cell and, optionally, to one or more geographically neighboring cells.

SUMMARY OF THE INVENTION

A communication network in accordance with this invention comprises a base station and a plurality of distributed cells which are remote from the base station. The distributed cells include, when in operation, at least one operative cell. The network further comprises transmission means for carrying information, including forward signals and reverse signals, between the base station and said cells, and there are distinctive transmission time delays between the base station and the cells. The network still further comprises means for distinguishing between the distinctive transmission time delays and thereby distinguishing between the various cells.

Preferably the network further includes means for restricting the transmission of forward signals from the base station only to an operative cell and, optionally, to neighboring cells.

The invention further comprises a method of communication between a base station and distributed cells, utilizing the foregoing structure.

BRIEF DESCRIPTION OF THE DRAWINGS

The invention may be better understood from the following detailed description taken in conjunction with the accompanying figures of the drawings, wherein:

FIG. 1 is a diagram illustrating a prior art communications network with RF-sector antenna sections;

FIG. 2 is a block diagram showing transmit and receive ports of the network of FIG. 1;

FIG. 4 is a diagram illustrating the transmit and receive ports of the network of FIG. 3;

FIG. 5 is a diagram of a portion of the network shown in FIG. 3 and further illustrates the present invention;

FIG. 6 is a signal vs. time diagram illustrating the operation of a network according to this invention;

FIG. 7 shows a time delay table of the network of FIGS. 3 to 6; and

DESCRIPTION OF THE PREFERRED EMBODIMENTS

Figure 3:
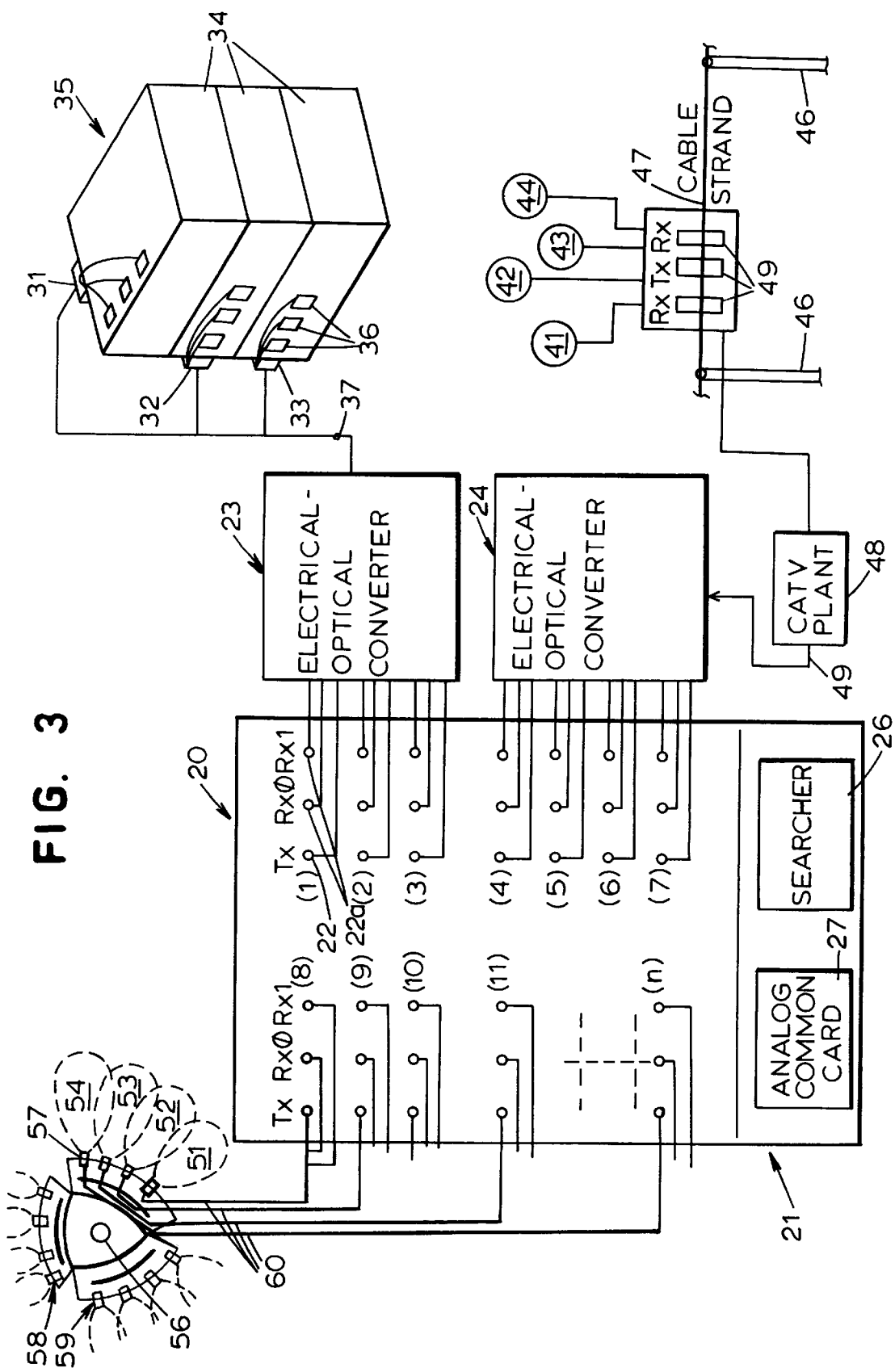
FIG. 3 is a diagrammatic illustration of a PCS or cellular network constructed in accordance with this invention.

FIGS. 1 and 2 illustrate a portion of a prior art PCS or cellular communication network. A cell includes a base station 10 having antennas 11 mounted on, for example, a tower or building (not shown). The surrounding geographical area is divided into three sectors 12a, 12b, and 12c, and the antennas 11 transmit and receive information to and from, for example, a fixed user or a mobile (not shown) such as a telephone in a motor vehicle. The antenna 11 of each sector encompasses the entire associated sector; if a mobile moves from one sector to another, there is a soft hand-off, and there is also a handoff if the mobile moves from the jurisdiction of one base station to another.

The communication equipment of the base station 10 includes RF ports connected to the antennas 11. As shown in FIG. 2, two receive ports 13 and one transmit port 14 are provided for each antenna 11 of the sectors 12a to 12c.

In a distributed-RF cell network or system in accordance with this invention, there are numerous cells spaced from but coupled to a base station, and each cell is connected to one transmit port and two receive ports of the communication equipment of the base station (see FIG. 4).

FIG. 3 illustrates a distributed-cell network including a distributed-RF base station 20 and a plurality of distributed-RF cells. In FIG. 3, eleven cells are shown, but it should be understood that fewer or a larger number of cells may be provided, and that the illustrated cells are only representative of the various cells.

The base station 20 includes a BS (base station) communication equipment 21 which has one transmit port 22 and two receive ports 22a for each cell. In FIG. 3, out of a total of n sets of ports 22 and 22a, only the ports of sets 1 to 11 are illustrated. Some of the cells are coupled to the sets 1 to 7 of the ports 22 and 22a through electrical-optical converters 23 and 24 at the base station. The BS communication equipment 21 includes a transmission time responsive searcher unit 26 and an analog common card 27. In other respects, the BS communication equipment may be similar to conventional base station communication equipment currently in use.

FIG. 3 further illustrates various types of cells and transmission mediums for coupling the cells to the BS communication equipment 21 of the base station 20. Cells 31, 32, and 33 are fixed remote cells, each one being on a separate floor 34 of a building 35. Each cell 31–33 includes transmit and receive ports 36 which are coupled to the port sets 1 to 3 of the base station ports, through a fiber optic line 37 and the electrical-optical converter 23. The remote cells 31–33 are for use by fixed and mobile subscribers. Both transmit and receive antennas are required.

Distributed remote cells 41, 42, 43 and 44 may also be for fixed and mobile subscribers (or users) or each may include a remote antenna (not illustrated). A geographically adjacent cable TV network includes a cable strand on utility poles 46, and the cable strand extends to a CATV plant 48. Remote transmit—receive ports 49 couple the cells 41–44 to the strand 47, whereby the cell communications are superposed on the cable. A fiber optic line 49 couples the CATV plant 48 to the electrical—optical converter 24 which connects the cell communications to the sets 4 to 7 of ports 22 and 22a.

Remote cells 51 to 54 are at a remote tower 56. In this specific example, the geographical area around the tower 56 is divided into three sectors, and the cells 51 to 54 include antenna arrays 57 which encompass contiguous portions on one of the three sectors. The other two sectors are covered by similar antenna arrays which are illustrated diagrammatically at the reference numerals 58 and 59. The antennas of the cells 51, 52, 53, 54,—n of the tower 56 are coupled by cables 60 to the sets 8, 9, 10, 11—n of the ports of the BS communication equipment 21.

When one of the cells of the network receives a communication, such as a Fax or a telephone call, from a network user, the cell passes the communication to the base station 20 where, depending upon the user's instructions included in the communication, it may be forwarded to another cell or to another base station of the network. The transmission medium between the cells and the base station may be fibers or cables indicated by the numerals 37, 47 and 60; other mediums may be air and power transmission lines. There is an inherent small, finite length of time required for transmission from a remote cell to the BS communication equipment ports; the inherent delay may be created by the fibers inside the cable plant 48, for example. Further, cells coupled to the base station by different transmission mediums will likely be associated with different time delays. For cells including narrow-beam antennas and repeaters, the time delay may be artificially introduced by electronic digital or analog means, and not by a natural propagation phenomenon.

As a simplified specific example, assume a network including three cells numbered 1, 2 and 3 coupled to a base station. Cells 1 and 2 have similar inherent transmission time delays but cell 3 has an inherent time delay which differs from those of cells 1 and 2. Consequently the time delay of cell 3 is distinctive with respect to those of cells 1 and 2. Further, if an artificial time delay device is provided in the transmission medium between cell 1 and the base station, and if the modified delay makes the cell 1 time delay distinct from the inherent delays of cells 2 and 3, all three of the cells will be associated with distinctive time delays. Consequently, if the modified and inherent time delays are known and if the time delay of a communication received by the base station from one of the cells is measured and compared with the known time delays, it will be apparent that the BS communication equipment at the base station may identify the cell from which the communication was received.

FIGS. 5 and 6 show a specific example of means responsive to the time delays for determining the inherent and any modified time delays and/or distinguishing between, in order to identify the cell from which a communication emanates. In FIG. 5, a GPS system includes satellites indicated by the numeral 66, and transmissions 67 of the Universal Time Even Second are received by the cells 41 and 42 and by an antenna 68 at the base station 20. At a time event, indicated in FIG. 6 as the time 0, a signal transmitter 71, which is preferably located closely adjacent the cells 41 and 42, generates a signal 72 which is received by the cell 41 and the communication is forwarded to the base station 20. The communication includes the time when the transmission originated or the time of the mobile signal arrival can be measured by the communication equipment with reference to the GPS system time. The BS communication equipment at the base station 20 receives the communication and determines the length of time x (FIG. 6) for the signal 73 from the cell 41 to reach the base station 20.

The inherent time delay for the cell 42 is similarly measured. If the cell 42 (in FIG. 5) has close to the same inherent time delay as the cell 41, a delay element 74 is included in the circuitry of the cell 42. With reference to FIG. 6, the element 74 produces an additional delay time D to the inherent time delay x, whereby the modified time delay y of the cell 42 is distinct from the delay x of the cell 41.

In this manner, the time delays of all of the cells of the network of FIG. 3 are made distinct one from the other, either because the inherent time delays are different or because the delays are modified by the delay elements. The BS communication equipment of the base station 20 includes a table (see FIG. 7) which catalogs or lists the time delays of all of the cells of the network. When a communication is received by the base station communication equipment 21 from one of the associated cells, the communication includes time information showing the time when the call was received by the cell and forwarded to the base station. The time information is of course derived, in this example, from the GPS system; the base station communication equipment 21 receives the time information in the cell communication, computes the delay from the cell time information and the current time signal from the GPS system. The communication equipment 21 then compares the calculated delay with the previously known and stored delays in the computer table shown in FIG. 7. Since all of the cell transmission delay times are distinctive, the BS communication equipment is able to identify the cell from which the communication originated.

Figure 8:
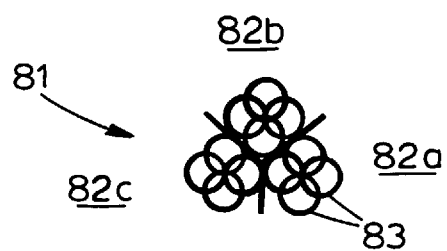
FIGS. 8 to 11 illustrate different forms of distributed cells.

FIGS. 8 to 11 illustrate specific examples of base transmission stations of a distributed-RF base station, for use in the present invention. In FIG. 8, a transmission station 81 forms three sectors 82a, 82b and 82c. Each sector is provided with multiple (in this example, four) remote distributed-RF cells 83, and there is simulcasting to the remote cells of each sector.

Figure 9:
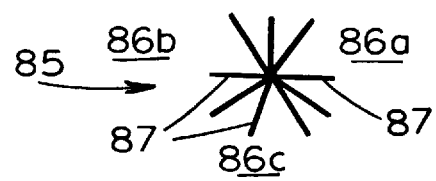

FIG. 9 illustrates a base transmission station 85 having three sectors 86a, 86b and 86c. In each sector are multiple narrow-beam antennas represented by the lines 87, each having, for example, a horizontal beam width equal to or less than 30 degrees. Again, there is simulcasting to the multiple antennas 87.

Figure 10:
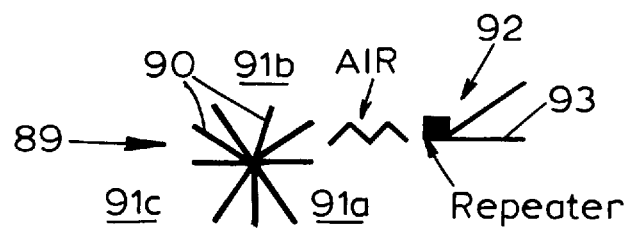

FIG. 10 illustrates a transmission base station 89 similar to that of FIG. 9, which includes narrow-beam antennas 90 in three sectors 91a, 91b and 91c. There is simulcasting of the antennas of some of the sectors. Associated with the sector 91a is a repeater cell 92 which is spaced from the station 89 and which extends the range of the station 89. The transmission medium between the cell 92 (which includes antennas 93) and the base station is air.

Figure 11:
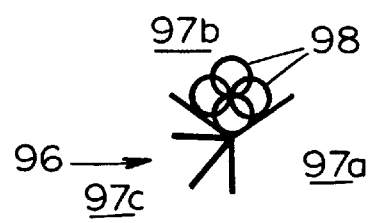

In the example of FIG. 11, a base station 96 forms three different sectors 97a, 97b and 97c, and shows that the embodiments of FIGS. 8 to 10 may be combined. The sector 97a includes an antenna that covers the entire sector and thus forms a macro sector. The sector 97b is formed by simulcasting multiple remote cells 98, and the sector 97c is formed by simulcasting multiple narrow-beam antenna distributed-RF cells.

The transmission medium between the base station ports and the distributed cells may be cable, fiber optics or air. For remotes it may be either cable or fiber; for a narrow-beam antenna it is normally cable; for a repeater it is normally fiber or air.

In summary, with a cellular or PCS network, the natural delay associated with each distributed-RF cell can be measured before the system is operational. The measurement technique may utilize a transmitter located close to the distributed-RF cell and a receiver at the base station receive port. The transmitter and the receiver are synchronized in time. Hence, the natural delay from the remote cell to the base station receive port can be measured. Once the natural delay is determined for all distributed-RF cells, one can examine the delays to determine whether they are all unique (or distinct). If there are two or more cells that have the same or closely similar time delays, a delay element is introduced in the path between the base station receive port and the remote to make all of the time delays unique. The delays created should not become ambiguous because of the position of a user in the network.

As an example, to distinguish a fixed subscriber from a mobile subscriber, a delay element may be attached at the upconverter (in the IF stage) of the fixed subscriber. The delay should be 1.5 times larger than the 99 percentile of the delay of the mobile subscriber.

In the operation of a network or system incorporating the present invention, the following is a discussion of the searching algorithms for the access channel and the traffic channel of the network. When a mobile initiates a call, the base station searcher 26 of the BS communication equipment will report the delay associated with the mobile pseudo-random noise (PN). The delay is used to determine which distributed-RF device the mobile locks on.

During the traffic state, preferably each channel element (CE) not only scans the distributed-RF cell where the mobile is located, it also scans a fixed number of geographically-neighboring cells so that softest handoff and other types of handoff are possible among distributed-RF cells. These geographically-neighboring cells are referred as buddy-cells. Softest handoff is defined as when a mobile moves from one cell to another cell within the same sector. Note that when a mobile communicates with two or more distributed-RF cells (but with the same PN offset), it is not a real handoff scenario but is in fact a multipath scenario During the traffic state, the base station searcher searches the reverse signals of a mobile from a few paths of the sectors in the active set. The analog common card 27 transmits the forward signal of the mobile to particular path(s) based on which cell(s) the mobile is located in. When the mobile is on the traffic channel, the finger delay will be caused only by the change of distance (between the mobile and the distributed-RF receive antenna) and by terrain/building reflection if the mobile stays inside the same distributed-RF device. The base station searcher keeps track of all the reverse multipaths associated with the mobile. If the mobile moves from one distributed-RF cell to another cell, the base station searcher will find a multipath with a distinctive delay. When the new multipath becomes stronger than the original multipath, the new multipath provides timing reference. Once the timing reference is updated, the CE needs to search a new set of distributed-RF cells, i.e., the neighboring buddy-cells of the cell whose reverse multipath provides timing reference.

To send a forward signal for a mobile to a distributed-RF cell where the mobile is located, and not to all cells of a sector, requires a baseband switching function in the analog common card. The traditional analog common card combines all forward channels for a sector into a multiplexed stream. In a system according to this invention, the analog common card combines pilot channel, paging channel, sync channel, and the traffic channels associated with one distributed-RF cell to a stream (That is to say, the forward signal of a mobile is sent to only one distributed-RF cell, where the mobile is located, not to all cells of the sector). One stream is destined to its respective distributed-RF device. For example, if there are four distributed-RF cell within a sector, the analog common card still forms four streams. These four streams will be sent to four distributed-RF cells through independent paths. Note that the pilot paging and sync channels still broadcast to all distributed-RF cells within a sector. However, the user traffic may not be identical in these streams.

Apparatus embodying the present invention has numerous advantages. It may be extended to wireless local loop application wherein there are both fixed subscribers and mobile subscribers. A distinctive delay element may be attached at the upconverter of the fixed subscribers, and the distinctive delay can be used by the base station to distinguish fixed subscribers from the mobile subscribers.

There are an increasing number of cellular and PCS networks incorporating distributed-RF devices. A network incorporating the present invention utilizes the distinctive delay of the distributed-RF devices to identify which device the reverse signal uses. Consequently, each cell becomes unique from the infrastructure view point. With more and more distributed-RF cells introduced per sector, the number of mobiles each cell sees is small. By instructing the channel element to search only a few cells, the searcher becomes efficient. By providing more cells with independent channel receivers, the capacity of the reverse link is increased. Since the forward signal of a mobile is sent to only a few cells of a sector, not to all cells of a sector, the forward link interference is reduced. The result is the forward link capacity is increased. Since the forward signal of a mobile is sent to only a few cells of a sector, not to all cells of a sector, the forward link interference is reduced. The result is the forward link capacity is increased.

Further advantages are that the parameters associated with initial access, handoff, and power control can be optimized based on the RF characteristics of each distributed-RF cell. Interference cancellation becomes feasible since each distributed-RF cell sees only a few mobiles. Forward and reverse overload control can be performed on a per cell basis. Since the mobile location can be identified with the accuracy of one distributed-RF cell, the granularity for the User Zone can be as fine as 0.5 km.

A network according to this invention also enhances the conventional debugging capability and the logging capability of the base station since the base station knows which path (associated with the device) the reverse signal uses. The base station can also send the forward signal (for a mobile) to only the specific cell (covered by the distributed-RF device) where the mobile is located without broadcasting the forward signal to all cells which form the sector. To send the forward signal of a mobile to a distributed-RF cells, and not to all cells of a sector, requires a baseband switching function in the analog common card. The traditional analog common card combines all forward channels for a sector into a multiplexed stream. In a network according to this invention, the analog common card combines pilot channel, paging channel, sync channel, and the traffic channels associated only with the particular distributed-RF cell to a stream. One stream is destined to its respective distributed-RF device. For example, if there are four distributed-RF cells within a sector, the analog common card will form four streams. These four will be sent to four cells through independent paths.

Since the network tracks where a mobile is and sends energy only to the mobile (after identifying the cell from its unique time delay) without interfering with other mobiles, this significantly reduces other-user interference on the forward link and increases the forward link capacity. Note that the pilot, paging and sync channels still broadcast to all distributed-RF cells within a sector. Hence, forward link interference reduction is only on the traffic channels. Since there is a distinctive delay associated with each distributed-RF cell (assuming delay symmetry on the forward and reverse links), transmit diversity is preserved on the forward link when the mobile is at the overlap region between two or more distributed-RF cells. This effectively reduces the $E_b/N_t$ requirement on the forward link. On the reverse link, by properly instructing the channel element to scan only necessary distributed-RF cells, the searcher efficiency is increased. By providing more cells with independent channel receivers, the capacity of the reverse link is increased.

With more and more distributed-RF cells introduced per sector, the number of mobiles each cell sees is small (for example, 3–5 mobiles). The channel element can be instructed to search only a few cells and reverse link interference is reduced. In order to limit the CE to see only a few cells, there should be a unique receive port for each unique path between each distributed-RF device and the base station. By the same token, to limit the forward signal to send to only a few cells, there should be a unique transmit port for each unique path between the distributed-RF device and the base station. For remote cells, this means the system needs to have one 1.25 MHZ spectrum on the forward link and 2.5 MHZ on the reverse link for each remote cell within the same sector (Note that the forward link spectrum requirement can be relaxed, i.e., still use 1.25 MHZ, if the forward signals from the same sector can be designed to be orthogonal and N-chip multipath resistant). For example, if there are four distributed-RF over-the-cable remotes in a sector, a total of 6 MHZ needs to be reserved on the downstream and a total of 12 MHZ needs to be reserved on the upstream. For narrow-beam antennas, dedicated cables can be used between the narrow-beam antenna and the base station port. For RF repeaters, dedicated fiber can be used. For over-the-air repeaters, the forward signal can be directed only to the repeater if a narrow-beam antenna is used in conjunction with it.

Since each distributed-RF cell only covers a small geographical area, the network settings (for sector power, initial access, handoff and power control) can be optimized to a finer granularity. The concept of self-optimizing or self-configuring is also applicable for distributed-RF cells. As long as there are sufficient performance statistics (for both forward and reverse links) for each cell, an expert system (or rule-based program) can be used at the BS communication equipment to derive the best network settings for each cell without human intervention. This drastically reduces the labor, time and cost associated with network optimization testing.

The present invention is applicable not only to IS-95 stations and its extensions, but is also applicable to third-generation CDMA (to support high-speed data) base stations and wireless local loop (WLL) base stations.

What is claimed is:

1. A cellular or PCS communications network comprising a base station, a distributed first cell, a distributed second cell, first and second transmission means for transmitting information between said first cell and said second cell, respectively, with said base station, said first transmission means including a first time delay between the sending and receipt of information between said base station and said first cell, said second transmission means including a second time delay between the sending and receipt of information between said base station and said second cell, said first time delay being distinct from said second time delay, and said communication network further including distinguishing means responsive to said first time delay and to said second time delay for distinguishing between said first and second time delays and for identifying said first and said second cells based on said time delays.

2. A communications network as set forth in claim 1, wherein at least one of said first and said second transmission means includes a time delay element for modifying said time delay.

3. A communications network as set forth in claim 1, wherein said distinguishing means comprises a searcher of a communication equipment of said base station.

4. A communications network as set forth in claim 1, wherein said at least one of said transmission means comprises a fiber optics line.

5. A communications network as set forth in claim 1, wherein said at least one of said transmission means comprises a cable strand.

6. A communications network as set forth in claim 1, wherein said at least one of said transmission means comprises antennas.

7. A communications network as set forth in claim 1, wherein said distinguishing means comprises base station communication equipment including means for storing time delay values of said cells, and means for comparing a measured time delay with said stored time delay values and thereby identifying a cell associated with said measured time delay.

8. A communications network as set forth in claim 1, wherein said base station comprises communication equipment including one transmission port and two receive ports for each of said cells.

9. A cellular or PCS communications network comprising
a) a base station;
b) a plurality of distributed cells;
c) a plurality of transmission mediums, each of said transmission mediums coupling one of said cells with said base station for carrying communications between said cells and said base station;
d) there being a distinct time delay inherent in each of said transmission mediums, said time delays being distinct one from another and each of said time delays being associated with one of said distributed cells; and e) said base station including communication equipment means for comparing a measured time delay with said distinct time delays and thereby identifying a cell associated with said measured time delay.

10. A method of distinguishing between distributed cells of a communications network including a base station and at least first and second distributed cells, said first and said second distributed cells being respectively coupled to said base station by first and second transmission mediums which carry information between said base station and said distributed cells, said method comprising the steps of determining a first time delay for first information moving on said first transmission medium between said base station and said first distributed cell, determining a second time delay for second information moving on said second transmission medium between said base station and said second distributed cell, said first and second time delays being distinct one from the other, determining a third time delay for third information moving on one of said first and said second transmission mediums, and comparing said third time delay with said first and said second time delays and thereby determining whether said third information moved on said first or said second transmission mediums.

11. A method as set forth in claim 10, wherein said first time delay and said second time delay include inherent time delays of said first and said second transmission mediums.

12. A method as set forth in claim 11, and further including the step of providing a time delay element in said first transmission medium, said time delay element being added to said inherent time delay of said first time delay.

13. A method of identifying distributed cells of a cellular or PCS communications network, said network including a base station and a plurality of distributed cells coupled to said base station by transmission mediums, said method comprising the steps determining the transmission time delay between each of said cells and said base station, storing said determined transmission time delays in a table, comparing a measured time delay with said time delays stored in said table and thereby identifying a cell associated with said measured time delay, and then directing communications from said base station primarily to said identified cell.

* * * * *